United States Patent
Huschmann et al.

(10) Patent No.: US 6,728,347 B1
(45) Date of Patent: Apr. 27, 2004

(54) NETWORK STATION

(75) Inventors: Wolfgang Huschmann, Bautzen (DE); Jost Kawczyk, Löbau (DE); Rainer Günther, Bautzen (DE); Mirko Busch, Flöha (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/521,050

(22) Filed: Mar. 8, 2000

(30) Foreign Application Priority Data

Mar. 17, 1999 (DE) .......................... 199 12 008

(51) Int. Cl.[7] .................. H04M 11/00; H04M 1/00; H04M 9/00
(52) U.S. Cl. ................. 379/93.09; 379/93.05; 379/399.01; 379/413.03
(58) Field of Search ............. 379/90.01, 93.01, 379/93.05, 93.06, 93.09, 399.01, 413.04, 377, 383, 93.07, 413.02, 413.03

(56) References Cited

U.S. PATENT DOCUMENTS

| | | | | |
|---|---|---|---|---|
| 5,164,982 A | * | 11/1992 | Davis ...................... | 379/93.17 |
| 5,365,577 A | * | 11/1994 | Davis et al. .............. | 379/93.17 |
| 5,610,922 A | * | 3/1997 | Balatoni ..................... | 370/468 |
| 5,627,827 A | * | 5/1997 | Dale et al. .................. | 370/359 |
| 5,943,404 A | * | 8/1999 | Sansom et al. ........... | 379/93.06 |
| 6,272,209 B1 | * | 8/2001 | Bridger et al. ........... | 379/27.01 |
| 6,301,340 B1 | * | 10/2001 | Sansom et al. ........... | 379/93.06 |
| 6,314,102 B1 | * | 11/2001 | Czerwiec et al. ........ | 370/395.6 |
| 6,477,249 B1 | * | 11/2002 | Williamson et al. ... | 379/399.01 |
| 6,483,904 B1 | * | 11/2002 | Yucebay ................... | 379/93.02 |

* cited by examiner

Primary Examiner—Binh Tieu
(74) Attorney, Agent, or Firm—Dicran Halajian

(57) ABSTRACT

The invention relates to a network station (1) comprising a selector switch (4) for coupling a switching center (2) to a POTS or ISDN telephone, and a detection circuit (3). After the detection circuit (3) has been made operative or after the mode change from the POTS mode to the ISDN mode, the detection circuit (3) controls the selector switch (4) such that this switch goes to the ISDN mode and thus couples the switching center (2) to an ISDN network terminator (11). When the ISDN mode is changed into the POTS mode, the selector switch (4) is actuated by the detection circuit (3) so that the switch couples the switching center (2) to the POTS telephone.

3 Claims, 2 Drawing Sheets

NETWORK STATION

FIELD OF THE INVENTION

The invention relates to a network station to be operated by a subscriber.

BACKGROUND OF THE INVENTION

The telecommunication networks are nowadays still provided with both analog and digital terminals in the subscriber area. With analog operation, which is also referred to as the POTS mode (POTS=Plain Old Telephone Service), the analog terminal receives analog signals from an analog module in a switching center, and with digital operation, which is referred to as the ISDN mode (ISDN=Integrated Services Digital Network), the digital terminal receives digital signals from a digital module in the switching center. For the digital operation it is necessary to have an ISDN network terminator which is inserted between the digital terminal and the digital telephone.

SUMMARY OF THE INVENTION

It is an object of the invention to provide a network station which, in the event of a mode change in the switching center, enables operation both in the POTS mode and in the ISDN mode.

The object is achieved by a network station comprising a selector switch for coupling a switching center to a POTS or ISDN telephone which network station contains a detection circuit which, after being put into operation or after a mode change from the POTS mode to the ISDN mode, is provided for coupling the switching center to an ISDN network terminator and, in the event of a mode change from the ISDN mode to the POTS mode, for coupling the switching center to the POTS telephone by actuation of the selector switch.

After being put into operation, the network station couples the switching center to an ISDN telephone via a selector switch. The network station is put into operation, for example, after a network failure or after it has been built-in at a subscriber station. When the detection circuit recognizes that there is no ISDN mode available, the detection circuit controls the selector switch so that it couples the switching center to an analog or POTS telephone. The advantage of the measures according to the invention is that a change-over from the analog to the digital mode of operation can be effected practically in a remote controlled fashion by the switching center and, therefore, no service need to be rendered at the subscriber end.

An embodiment of the detection circuit comprises a rectifier coupled to the input terminals of the selector switch, a threshold detector, a first and a second pulse shaper circuit and a bistable relay. The threshold detector compares the signal produced by the rectifier to a threshold value and the first pulse shaper circuit generates an actuation signal for the bistable relay to change the selector switch from the POTS mode to the ISDN mode when the signal produced by the rectifier has reached the threshold value. The second pulse shaper circuit generates an actuation signal for the bistable relay to change the selector switch from the ISDN mode to the POTS mode when the ISDN network terminator cannot carry out an ISDN operation with the switching center.

The detection circuit further includes a timing element which is provided for delaying the generation of an actuation signal of the first pulse shaper circuit. This suppresses noise pulses and the AC signaling voltage in the signal arriving from the switching center.

A microprocessor coupled to the ISDN network terminator evaluates status messages of the ISDN network terminator. The second pulse shaper circuit generates the actuation signal for the bistable relay after the microprocessor has generated an excitation signal. The microprocessor generates an excitation signal when the microprocessor receives a message from the ISDN network terminator about the ISDN mode that cannot be effected.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE INVENTION

Figure 1:
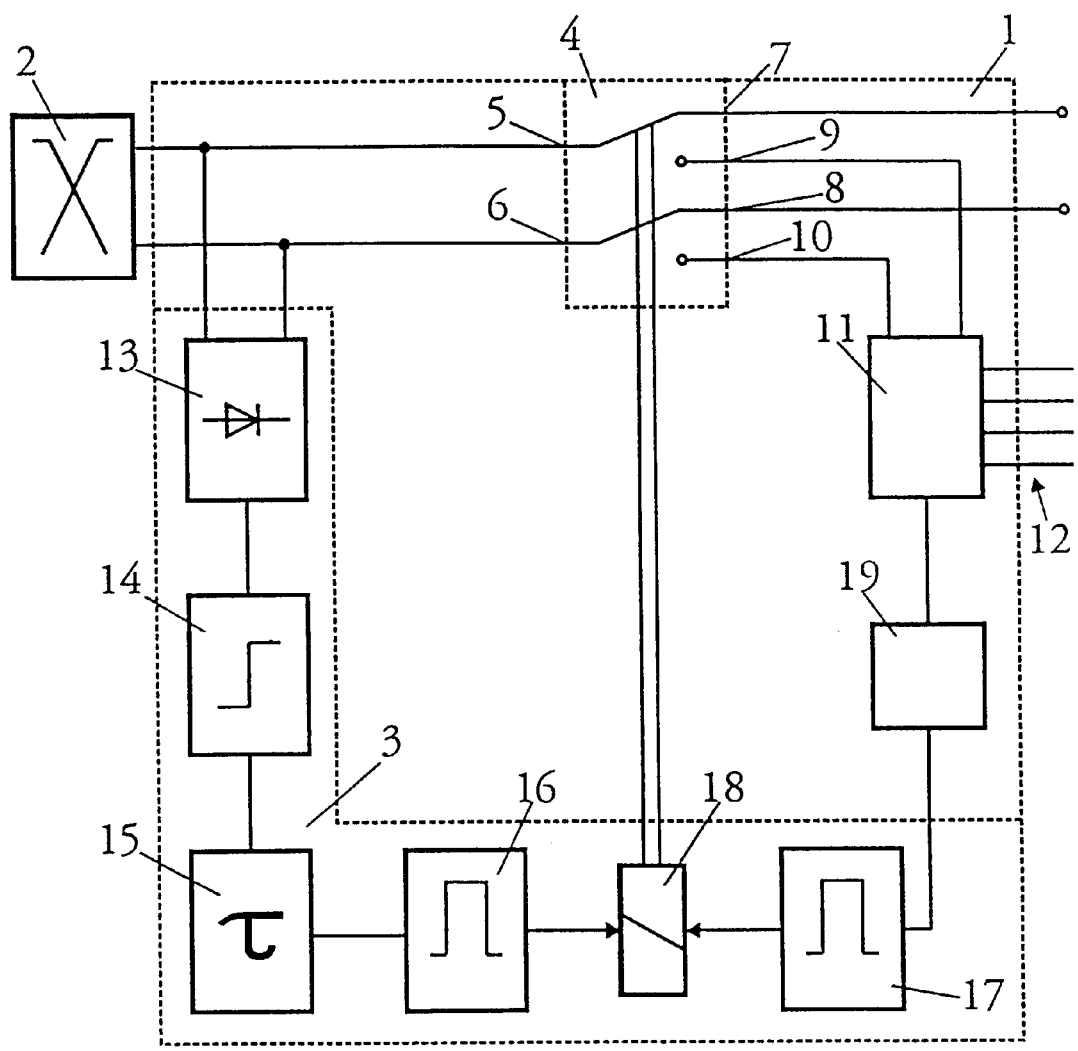
FIG. 1 shows a block diagram of a network station comprising a selector switch for coupling a switching center to an analog or digital telephone.

FIG. 1 shows a network station 1 which couples a switching center 2 either to an analog or a digital telephone. The network station 1 comprises a detection circuit 3 which detects whether the switching center 2 can be coupled to the analog or digital telephone. By exchanging a module in the switching center 2, the switching center can be converted from the analog to the digital mode. The detection circuit 3 included in the network station 1 automatically detects the change of a mode of operation and controls, in dependence on the detected mode of operation, a selector switch 4 also included in the network station. The analog mode is also referenced POTS mode (POTS=Plain Old Telecommunication Service) and the digital mode as ISDN mode (ISDN=Integrated Services Digital Network).

The selector switch 4 is coupled via two input terminals 5 and 6 to the switching center 2, via two output terminals 7 and 8 to the analog telephone (not shown) and via two further output terminals 9 and 10 to an ISDN network terminator 11. During the POTS mode the input terminals 5 and 6 are connected to the output terminals 7 and 8. In the other case, in the ISDN mode, the input terminals 5 and 6 are connected to the output terminals 9 and 10. The ISDN network terminator 11 supplies signals for the ISDN telephone which is not further shown to its $S_0$ interface 12.

The detection circuit 3 includes a rectifier 13, a threshold detector 14, a timing element 15, a first and a second pulse shaper circuit 16 and 17 and a bistable relay 18 and a microprocessor 19. It is assumed that the selector switch has connected the input terminals 5 and 6 to the output terminals 7 and 8 (POTS mode). The detection circuit 3 detects, for example, after a card provided for the operation of the analog telephone has been exchanged for a card provided for the operation of the digital telephone, that the telephone works in the ISDN mode. The detection circuit 3 then works as follows:

The supply voltage applied to the input terminals 5 and 6 of the selector switch 4 is converted by the rectifier 13 into a defined polarity voltage. The supply voltage is a DC voltage whose polarity is unknown. The threshold detector 14, when a threshold voltage in the output voltage of the rectifier 13 reaches or surpasses a threshold voltage, produces a signal which activates the next timing element 15. The timing element 15 is deactivated when the output voltage produced by the rectifier 13 is smaller than the threshold voltage. After a time τ, after the timing element 15 has been activated, the timing element 15 produces a certain output signal which is converted into a brief current pulse by the subsequent first pulse shaper circuit 16. The timing element enables the suppression of noise pulses and the AC signaling voltage on the input terminals 5 and 6. The brief current pulse produced by the first pulse shaper circuit 16 is supplied to the bistable relay 18 which changes to the ISDN mode and connects in the selector switch 4 the input terminals 5 and 6 to the output terminals 9 and 10. The detection circuit 3 further changes to a high-impedance state, so that the current flowing in the detection circuit 3 is much smaller than the current flowing through the input terminals 5 and 6.

After the ISDN network terminator 11 has been coupled to the switching center 2 and during the operation in the ISDN mode, the ISDN network terminator 11 exchanges various messages with the switching center 2 (exchange of digital codewords). Such an ISDN network terminator 11 produces on a certain output a status message which gives information about whether data or messages are exchanged with the switching center 2. Such an exchange of messages is not possible, for example, when a module for analog operation has been newly inserted in the switching center 2.

The status message of the ISDN network terminator 11 is received by the microprocessor 19. In the case where the microprocessor 19 finds out that the ISDN mode is not working, a signal is sent to the second pulse shaper circuit 17 which generates a brief current pulse. As a result of the brief current pulse applied to the bistable relay 18, the selector switch will connect the input terminals 5 and 6 to the output terminals 7 and 8. In this way the POTS mode is used, in which the analog telephone is coupled to the switching center 2.

Figure 2:
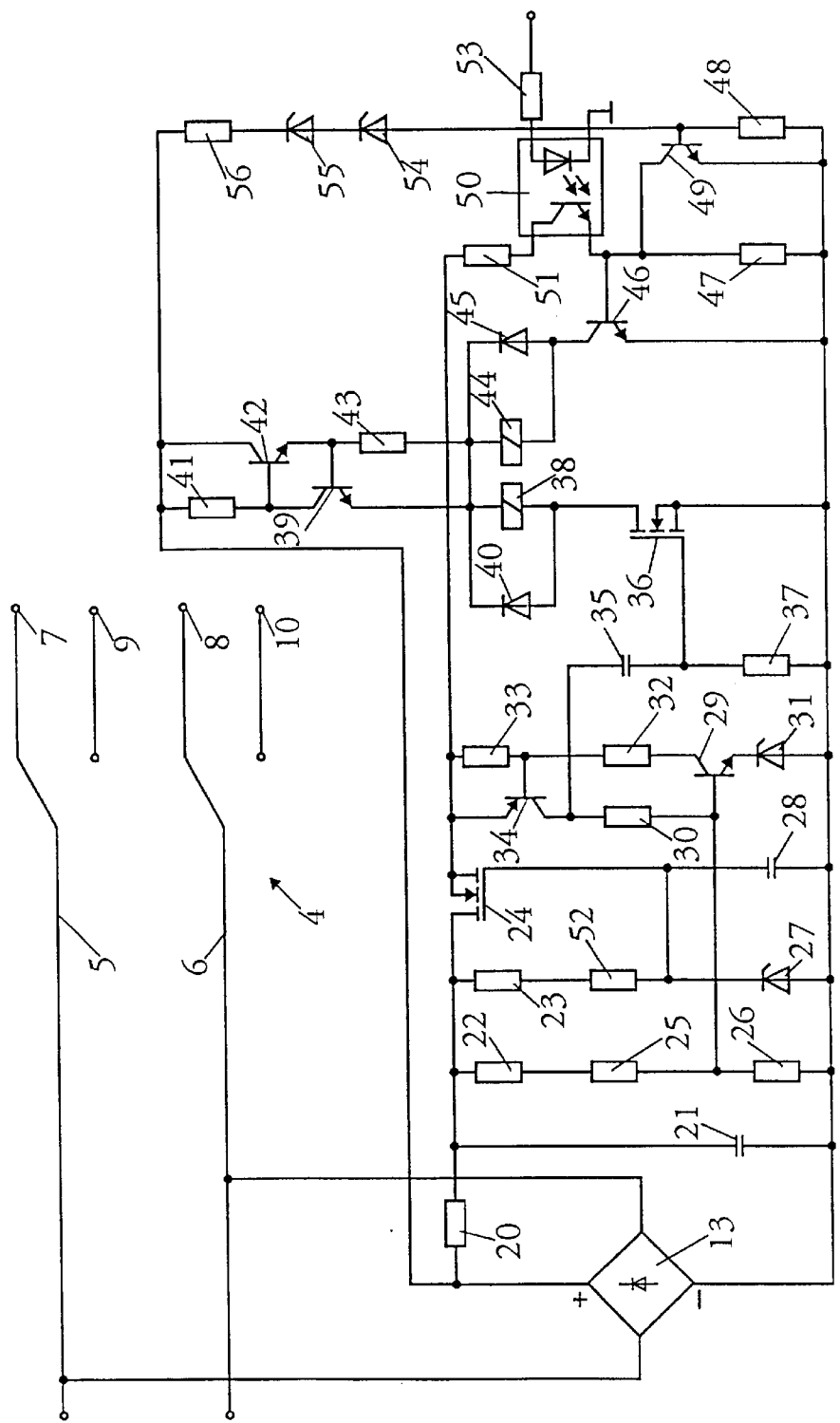
FIG. 2 shows a detailed circuit diagram of the network station.

A detailed circuit diagram of the detection circuit 3 is shown in FIG. 2. The detection circuit 3 shows, just like FIG. 1, the rectifier 13, whose AC voltage terminals are connected to the input terminals 5 and 6 of the selector switch 4 and is arranged, for example, as a Graetz bridge circuit. The positive output terminal of the rectifier 13 is connected to a resistor 20 whose other terminal forms a common node with a respective first terminal of a capacitor 21, a resistor 22 and resistor 23 and to the drain terminal of an n-channel MOS field effect transistor 24. The second terminal of the resistor 22 is connected via two series-arranged further resistors 25 and 26, the second terminal of the resistor 23 via a resistor 52 and a Z-diode 27 and the second terminal of the capacitor 21 to the negative output terminal of the rectifier 13. The cathode of the Z-diode 27 and the terminal of the resistor 52 that is not connected to the resistor 23 are connected to the gate terminal of the transistor 24 and to a capacitor 28. The other terminal of the capacitor 28 is connected to the negative output terminal of the rectifier 13.

The common terminal of the resistors 25 and 26 is connected to the base of an NPN bipolar transistor 29 and to a resistor 30. The emitter of the transistor 29 is connected to the cathode of a Z-diode 31 whose anode is connected to the negative output terminal of the rectifier 13, and the collector of the transistor 29 is connected to a resistor 32. The other terminal of the resistor 32 is connected to a first terminal of a resistor 33 and the base of a PNP bipolar transistor 34. The emitter of the transistor 34, the second terminal of the resistor 33, a first terminal of a resistor 51 and the source terminal of the transistor 24 form a common node. The collector of the transistor 34 is connected to a capacitor 35 and to the terminal of the resistor 30 that is not connected to the base of the transistor 29. A further connection is formed by the other terminal of the capacitor 35 and the gate terminal of an n-channel MOS field effect transistor 36 and of a resistor 37 whose other terminal is connected to the negative output terminal of the rectifier 13. The source terminal of the transistor 36 is also connected to the negative terminal of the rectifier 13 and the drain terminal thereof to the negative terminal of a first winding of the bistable relay 18. The first winding 38 actuates the switches of the selector switch 4. The positive terminal of the winding 38 is connected to the emitter of an NPN bipolar transistor 39. In parallel with the winding 38 is connected a diode 40. The collector of the transistor 39 is connected to a resistor 41 and to the base of an NPN bipolar transistor 42. A common terminal is formed by the base of the transistor 39, the emitter of the transistor 42 and a first terminal of a resistor 43. The collector of the transistor 42 and the other terminal of the resistor 41 are connected to the positive output terminal of the rectifier 13.

A further parallel circuit is formed by a second winding 44 of the bistable relay 18 and a diode 45 is arranged between the other terminal of the resistor 43 and the collector of an NPN bipolar transistor 46. The positive terminal of the winding 44, which is provided for actuating the switches of the selector switch 4, is connected to the resistor 43 and the positive terminal of the first winding. The emitter of the transistor 46 is also connected to the negative output terminal of the rectifier 13 just like the first terminals of two resistors 47 and 48 and the emitter of an NPN bipolar transistor 49. The base of the transistor 46, the second terminal of the resistor 47 and the collector of the transistor 49 are connected to the emitter of the transistor of an optocoupler 50. The collector of the transistor of the optocoupler 50 is connected to the second terminal of the resistor 51. The anode of the diode in the optocoupler 50 is switched to the microprocessor 19 via a resistor 53. The cathode of the diode in the optocoupler 50 is connected to ground. The second terminal of the resistor 48 and the base of the transistor 49 are further connected, via two series-arranged Z-diodes 54 and 55, to the first terminal of a resistor 56, whose second terminal is connected to the positive output terminal of the rectifier 13.

The resistor 20 and the capacitor 21 form the timing element 15. The threshold detector 14 comprises, in essence, the transistors 29 and 34, the resistors 30, 32 and 33 and the Z-diode 31. The first pulse shaper circuit 16 is formed by the transistor 36, the capacitor 35 and the resistor 37. The second pulse shaper circuit 17 comprises, in essence, the transistor 46. When, for example, after a module has been built-in for the operation of a digital telephone in the switching center, or after the network station 1 has been taken into operation, a current flows from the switching center to the network station 1, the capacitor 21 will be charged. When the charging state of the capacitor 21 reaches a certain threshold value, the transistor 29 becomes conductive and so does, as a result, the transistor 34. The threshold value is determined by the base-emitter voltage of the transistor 29 and the zener voltage of the Z-diode 31. After the transistor 34 has become conductive, the capacitor 35 is charged. If the charging state of the capacitor 35 indicates a certain threshold value, the transistor 36 is briefly rendered conductive and thus delivers a brief current pulse to the first winding 36, so that the first winding 38 puts the switches in the selector switch into the ISDN mode.

Both the first and the second winding 38 and 44 respectively, receive the current from a current source which is formed by the transistors 39 and 42 and the resistors 41 and 43. The diodes 40 and 45 connected in parallel to the windings 38 and 44 have a protective function for the transistors 36 and 46.

After the switches of the selector switch 4 have been actuated by the first winding 38, the circuit becomes a high-impedance circuit, so that only a very small current flows into the detection circuit 3. The high impedance is reached, more particularly, by the resistors 22, 23, 25 and 52 which are selected to be high-value resistors. A renewed current pulse cannot be received by the winding 38 until the capacitor 21 is recharged after being discharged. The transistor 24 and the Z-diode 27 have the function of keeping the voltage for the elements 35 and 37 at a constant level, so that the first pulse shape does not become voltage-dependent. The capacitor 28 has a smoothing function.

When the microprocessor 19 takes from the status message sent by the ISDN network terminator 11 the information that the ISDN mode is no longer present, the microprocessor delivers a pulse to the optocoupler 50. This pulse is delivered to the transistor 46 by the transistor of the optocoupler 50 which electrically isolates the microprocessor 19 from the second pulse shaper circuit 17. The transistor 46 briefly becomes conductive and leads a current pulse to the second winding 44, so that the switches in the selector switch 4 change to the POTS mode.

Together with the two series-arranged Z-diodes 54 and 55 and the resistor 56, the resistors 47 and 48 and the transistor 49 prevent the transistor 46 becoming conductive when the voltage on the output terminals of the rectifier surpass a voltage of 80 volts. In that case, t is impossible for the POTS mode to be used.

What is claimed is:

1. A network station (1) comprising a selector switch (4) for coupling a switching center (2) to a POTS or ISDN telephone, a detection circuit (3) which, after being put into operation or after a mode change from the POTS mode to the ISDN mode, is provided for coupling the switching center (2) to an ISDN network terminator (11) and, in the event of a mode change from the ISDN mode to the POTS mode, for coupling the switching center (2) to the POTS telephone by actuation of the selector switch (4), wherein the detection circuit (3) comprises a rectifier (13) coupled to the input terminals (5,6) of the selector switch (4), a threshold detector (14), a first and second pulse shaper circuit (16, 17) and a bistable relay (18), in that the threshold detector (14) is provided for comparing the signal produced by the rectifier (13) to a threshold value and the first pulse shaper circuit (16) is provided for generating an actuation signal for the bistable relay (18) to change the selector switch (4) from the POTS mode to the ISDN mode when the signal generated by the rectifier (13) reaches the threshold value, and in that the second pulse shaper circuit (17) is provided for generating an actuation signal for the bistable relay (18) to change the selector switch (4) from the ISDN mode to the POTS mode when the ISDN network terminator (11) cannot carry out an ISDN operation with the switching center (2).

2. A network station as claimed in claim 1, characterized in that the detection circuit (13) further includes a timing element (15) which is provided for delaying the generation of an actuation signal of the first pulse shaper circuit (16).

3. A network station as claimed in claim 1, characterized in that a microprocessor (19) coupled to the ISDN network terminator (11) is provided for evaluating status messages of the ISDN network terminator (11), in that the second pulse shaper circuit (17) is provided for generating the actuation signal for the bistable relay (18) after the microprocessor (19) has generated an excitation signal and in that the microprocessor (19) is provided for generating an excitation signal when the microprocessor (19) receives a message from the ISDN network terminator (11) about the ISDN mode that cannot be executed.

\* \* \* \* \*